(12) United States Patent
Motahar

(10) Patent No.: US 11,436,386 B2
(45) Date of Patent: Sep. 6, 2022

(54) SYSTEM FOR IMPROVING THE DESIGN, CONSTRUCTION AND OPERATION OF A STRUCTURE

(71) Applicant: WEMARATHON, Atlanta, GA (US)

(72) Inventor: Ramtin Motahar, Atlanta, GA (US)

(73) Assignee: Joulea, LLC, Atlanta, GA (US)

( * ) Notice: Subject to any disclaimer, the term of this patent is extended or adjusted under 35 U.S.C. 154(b) by 569 days.

(21) Appl. No.: 16/344,796

(22) PCT Filed: Oct. 24, 2017

(86) PCT No.: PCT/US2017/058148
§ 371 (c)(1),
(2) Date: Apr. 24, 2019

(87) PCT Pub. No.: WO2018/081171
PCT Pub. Date: May 3, 2018

(65) Prior Publication Data
US 2020/0057825 A1    Feb. 20, 2020

Related U.S. Application Data

(60) Provisional application No. 62/412,089, filed on Oct. 24, 2016.

(51) Int. Cl.
*G06F 30/13*    (2020.01)
*G06F 119/06*   (2020.01)

(52) U.S. Cl.
CPC .......... *G06F 30/13* (2020.01); *G06F 2119/06* (2020.01)

(58) Field of Classification Search
CPC ....... G06F 30/00; G06F 30/13; G06F 2119/06
USPC .............................................................. 703/1
See application file for complete search history.

(56) References Cited

U.S. PATENT DOCUMENTS

| | | | |
|---|---|---|---|
| 8,229,715 B1 | 7/2012 | Teller et al. | |
| 8,285,521 B1 | 10/2012 | Chim et al. | |
| 8,516,572 B2 | 8/2013 | Chim et al. | |
| 8,843,352 B2 | 9/2014 | Kaufmann et al. | |
| 8,884,961 B2 | 11/2014 | Khan et al. | |
| 8,954,297 B2 | 2/2015 | Teller et al. | |
| 8,977,405 B2 | 3/2015 | Shiel | |
| 9,043,163 B2 | 5/2015 | Mezic et al. | |
| 9,292,972 B2 | 3/2016 | Hailemariam et al. | |
| 9,353,514 B1 | 5/2016 | Wine et al. | |
| 2010/0057416 A1* | 3/2010 | Peterman | G06F 30/20 703/6 |
| 2010/0106674 A1* | 4/2010 | McLean | F24F 11/30 706/52 |
| 2011/0246155 A1* | 10/2011 | Fitch | G06F 30/20 703/6 |
| 2012/0259594 A1* | 10/2012 | Khan | G06T 13/60 703/1 |
| 2012/0296611 A1 | 11/2012 | Teller et al. | |

(Continued)

OTHER PUBLICATIONS

Brech, Brad et al., "Smarter Cities Series: Understanding the IBM Approach to Efficient Buildings", IBM Redbooks. (Year: 2011).*

(Continued)

*Primary Examiner* — Cedric Johnson
(74) *Attorney, Agent, or Firm* — Notio Law Group, LLC

(57) ABSTRACT

The present disclosure relates to a system and method for optimizing building design, construction and operation by tracking post-construction operational data, along with design and construction data. The system addresses the energy performance gap associated with modern construction.

20 Claims, 7 Drawing Sheets

(56) References Cited

U.S. PATENT DOCUMENTS

| | | | |
|---|---|---|---|
| 2012/0323382 A1* | 12/2012 | Kamel | G06Q 50/06 |
| | | | 700/286 |
| 2014/0288890 A1* | 9/2014 | Khainson | G06F 30/13 |
| | | | 703/1 |
| 2014/0372859 A1 | 12/2014 | Lam et al. | |
| 2015/0317418 A1 | 11/2015 | Sankarapandian et al. | |
| 2016/0195288 A1* | 7/2016 | Hamstra | F24F 11/89 |
| | | | 700/276 |

OTHER PUBLICATIONS

A BIM based data model for an integrated building energy information management in the design and operation stages, Moon et al., 13th Conference of International Building Performance Simulation Association, Chambery, France Aug. 2013.

Driving Building Efficiency Using Operation Data and 3D Modelling, http://blog iesve.com/index.php/2015/11/11/driving-building-efficiency-using-operational-data-3d-modelling/ Nov. 2015.

Integration of BIM and live sensing information to monitor building energy performance, Wang, et al., 30th CIB W&* International Conference—Oct. 9-12, 2013.

Sensory Buildings (Smarter than your honor student), Leonidas et al., Wood Harbinger Publishing, Jun. 2014.

Space-Mate: Computational Modeling for Building and Occupant Cooperative Sustainable Performance; Law et al., Stanford University, Jun. 2016.

Smarter Cities Series: Understanding the IBM Approach to Efficient Buildings, Brech et al. Redbooks publishing, 2011.

\* cited by examiner

SYSTEM FOR IMPROVING THE DESIGN, CONSTRUCTION AND OPERATION OF A STRUCTURE

The present disclosure relates to a system and method for improving building design, construction and operation. More specifically, this disclosure relates to a system and method for designing resource efficient buildings and operating those building in a resource efficient manner making them economical to operate. Still more specifically, this disclosure relates to a computer implemented system that generates and tracks post-occupancy operational data, along with both design data and construction data to minimize the "energy performance gap" associated with modern construction. The system uses post-occupancy resource data and can improve resource use or building operation in a currently built environment, as well as inform the design, construction and resource use in a subsequent building project.

BACKGROUND

Everyone, including cities, towns, companies, and individuals, are all looking for ways to be more sustainable. Most sustainability initiatives desire a reduction in the use of energy or other resources. For most initiatives, the first step requires an understanding of where waste is occurring, and for large projects this is often a resource use study or energy consumption study. While, energy consumption studies look at the ultimate resource use of the built environment, e.g., city, arena, park or building, most are looking for an immediate solution to reduce energy consumption for the party commissioning the study. Large scale evaluations, such as the one conducted by Siemens in San Francisco using their City Performance Tool (CyPT), evaluated resource use across a city and looked for ways to improve energy consumption. This type of large scale resource evaluation generally guides a cost benefit analysis of immediate versus long term changes to reduce energy consumption.

Until recently, the energy performance gap between modelled resource use and actual operation was difficult to monitor, let alone understand. Recent developments in automated building meters and other monitoring devices has made this gap visible to owners and building operators. As these performance gaps have been recognized, the following question has arisen. Who should bear responsibility for these performance gaps, the architects, engineers, energy modelers, general contractor, subcontractors or the owner? Some suggest that the problem is merely a mathematical construct and that the industry is currently working to find better predictive mathematical modeling techniques.

Resource analysis for new construction is generally accomplished using building energy models (BEMs). BEMs are computer generated models that are used to predict the resource usage of the post-occupancy of the built environment. BEMs such as EnergyPlus, IES and eQuest, are computer based software tools that focus on resource consumption, utility bills, and life cycle costs of various resource related items such as HVAC, lighting, and water consumption. While these models clearly address more than energy, they are nonetheless typically referred to a as energy models.

A typical energy model has inputs for location data such as weather conditions, building orientation, and other pertinent site features; building envelope, such as air infiltration goals, area orientation, glazing, solar absorbance and visible light transmittance; internal gains such as lighting, plug loads, sensible and latent loads from occupants; schedules such as occupancy data; and energy systems such as water heating systems, types of space heating, cooling, ventilating, fan and pump types and other aspects of HVAC.

BEMs have been available in the Architectural, Engineering, Construction & Operation ("AECO") industry for many years, but they are often underutilized. BEMs are most often used near the end of the design phase to verify that the designed environment will have the desired resource footprint once built. Outside of high performance buildings or buildings seeking certifications such as LEED, Living Building Challenge, etc., BEMs are seldom ever considered past the initial phase to guide design. Furthermore, the need to estimate the inputs and parameters employed by the BEMs creates discrepancies between the predicted and the actual resource performance. Consequently, each of the (1) design, (2) construction, and (3) operation phases are executed without an accurate reference basis (i.e., data and models), leading to discrepancies between the initial estimates of building resource usage in the design phase and actual operation of the building. These discrepancies from the BEMs can often be on the order of 20% to 50% under actual resource use post-occupancy. The sustainable commercial building community has recognized this problem. Consequently, standards such as LEED v4 and Living Building Challenge 3.0 are adding emphasis on commercial building performance verification. Unfortunately, these types of built environments are a small subset of new construction projects and an even smaller subset of the building stock and so these discrepancies continue to exist.

Along with underutilization of the BEMs, the construction industry has been slow to adopt other technologies. Currently, individual software packages are used throughout each phase of development including design, construction, and operation. The industry belief has been that the number and divergent nature of the professionals and processes involved with the development of a large building project makes it impossible for a single system to coordinate and facilitate all aspects of design and construction. This lack of connectivity between the various stages of design, construction, and operation stands as a significant hurdle to achieving a coordinated approach to reducing energy costs. Rarely does a post-occupancy review of the operation of a building yield the best resource usage for that built environment. In post-occupancy energy analysis, since the construction is complete, the best available energy profile will necessarily include design or construction flaws that already exist. For many years, no attempts were made to improve building efficiency by coordinating the design, construction and operation of a building into a single cohesive system.

Only recently has anyone even attempted to articulate a system that links the design phase and the construction phase of the building. Google discloses a computer implemented system to coordinate the design and construction of a structure. Their system is described in published U.S. Application No. 2012/0296611 and in U.S. Pat. Nos. 8,229,715; 8,285,521; 8,516,572; 8,843,352 and 8,954,297 and has been assigned to a new company, Flux. These patents, which are incorporated herein by reference, describe many of the steps and requirements for designing and constructing a building.

Likewise, IES a maker of energy modeling software, recently began a research and development initiative using operational data in some of their BEMs to improve the post occupancy evaluation efficiency of buildings modeled using their BEMs. IES is a proprietary system that imports data back from a handful of buildings using their BEMs back into their modeling platform and providing analysis of problem areas in the construction and operation of these buildings. This IES research and development initiative is very limited since it only collects feedback from certain buildings whose owners were willing to share the costs of the initiative, and it then only uses that collected information to impact the design of another building that is deemed to have sufficient similar benchmarks, i.e., similar size, similar use, similar location type, etc.

Like the systems as disclosed by Google and IES, the system as described herein takes advantage of efficiencies that result by coordinating the design, construction and operation of a structure. However, the system as described herein addresses significant shortcomings in both prior art systems.

Currently no avenue exists for using available resource study or other operational resource data to generate concrete improvements in the way that structures are designed or built. The construction industry, in particular, has lagged behind other industries in adopting technologies that could improve efficiency. Therefore, there seems to be a big disconnect between gathering post-occupancy operational information and using that information back in the design and/or construction phases of a built environment to accomplish long term resource reduction.

The system as described herein, referred to as JOULEA (Justified Operational Use of Lifecycle Energy Application), is designed to generate, compile and analyze information on resource use and provide feedback on ways to improve resource use in the immediate built environment. The system compiles virgin data, i.e., complete design, construction and operations data from newly built environments, as well as, after market data, e.g., design BEMs, and/or operational resource information for existing built environments. This information is collected into a single system that can work cooperatively with the software that is already being used in the AECO community. The operations data is generated, in part, from a series of sensors that are strategically placed into the built environment. In new construction, the sensors will be installed as part of the planning of the original construction during the design phase. For existing buildings and structures, the sensors would be added to the building and their data, along with a BEM and any available design and/or construction information, would be collected. While the name JOULEA will be used for ease herein when referencing this system, it is merely a name that doesn't impact the underlying system technology and could be changed.

The system as described can amass data from varied buildings and built environments, as well as design and construction projects without being limited by either the hardware or software (collectively referred to as "the platform") that is being used, or is intended to be used. Specifically, the platform attaches to the raw data that is sensed by the system, either through hardware (through sensors or other monitors) or software (through the use of software plug-ins.). The current system, hereinafter referred to as "JOULEA," collects data from disparate sources and can use any data management platform or master data management tool to normalize the data regardless of what platform it was developed in. The system uses an optimization engine to look for a variety of things including but not limited to, deficiencies or performance gaps that result from either design or construction; possible enhancements or improvements in resource use; and patterns indicative of building lifecycles, i.e., resource use over time.

The outputs of the optimization methods and engine are correlated and used to direct new building designs, constructions or operations and provide real-time feedback and recommendations to the appropriate platforms so that the design team and/or construction team can use those recommendations to immediately influence their choices. The system as described herein can overlay existing design, construction and/or operational platforms thereby allowing it to coordinate the information flowing from the varied systems and provide immediate feedback to the individual platforms where appropriate, in order to facilitate improvements in design, construction or resource usage during operation.

This system can improve all of design, construction and subsequent operating efficiency of a built environment, thereby closing the existing gaps between the design of the BEM and the actual performance of the built environment. In addition, by virtue of collecting divergent data, the system takes advantage of resource efficiencies or expertise developed in one built environment for another type of built environment.

SUMMARY

The disclosed embodiments include improved systems and methods for building development and operation.

One embodiment comprises a method for reducing the performance gap between a structure's resource model and a structure's resource use comprising, obtaining both resource model and post-occupancy resource use data from multiple built structures, obtaining a design, including design features, and a resource model for a new construction, comparing the design features with features in the multiple built structures, locating at least one feature or at least one series of features that are common to the built structure and the new construction, determining the accuracy of the resource model for the new construction.

Another embodiment comprises a computer implemented system for the design, construction and operation of a built environment, comprising a memory device for storing a set of instructions; one or more hardware processors to execute the set of instructions to: receive design data, construction data and operational resource use data from a first built environment comprising information from at least two sensors positioned within the first built environment; receive design, construction or operational data for a second built environment from a design platform, construction platform, or operations platform; compare the design data, construction data and operational resource use data of the first environment with the design, construction or operational data of the second built environment; and provide design, construction or operations alternatives to one or more of the design platform, the construction platform and/or the operations platform to improve resource use in the second built environment.

Another embodiment comprises a method for the design and management of a built environment comprising, collecting construction data and resource use data for a first built environment, wherein the resource use data comprises output from indwelling sensors placed within the built environment; optionally, collecting data regarding the design or energy modeling of the first built environment; receiving data from at least one platform in the design, construction or operation of a second built environment; comparing the data from the first built environment to the data of the second built environment; and providing at least one recommendation to one or more of the at least one design platform, construction platform and/or operation platform.

Another embodiment comprises a method for verifying construction, verifying completion of individual construction requirements, comprising, receiving, from one or more media collection devices, a media depicting completion of construction requirements, receiving, from one or more contractors, completion verification; and determining, based on the media and completion verification, the completion of the construction task.

Another embodiment comprises a non-transitory computer readable medium storing instructions that are executable by one or more processors to cause the one or more processors to execute a method for analyzing sensor data, the method comprising, receiving, from one or more sensor devices, information associated with building and resource usage, determining, from the information gathered from one or more sensor devices, where the building and resource use deviates from a previously generated BEM, suggesting, from the information gathered from the one or more sensor devices, ways to prevent deviations between the actual building resource usage and the BEM.

In addition, the system compares the design against operational data to determine whether the design is likely to actually be operated in the manner intended. The system as described herein can overlay the existing software platform and thereby coordinate the various systems by monitoring the design and/or construction for intended and unintended operational outcomes. The system informs designers regarding ways that buildings end up being used in an unintended manner. The system can collect data from any available source, including, for example, the design software, construction software, operational sensors, resource use studies, occupant feedback and the like. The system as described works in concert with systems such as those of Flux and IES, as described above.

It is to be understood that both the foregoing general description and the following detailed descriptions are exemplary and explanatory only and are not restrictive of the disclosed embodiments as claimed.

The accompanying drawings, which are incorporated in and constitute a part of this specification, illustrate disclosed embodiments, and together with the description, serve to explain the disclosed embodiments.

DETAILED DESCRIPTION OF THE DRAWINGS

Figure 1:
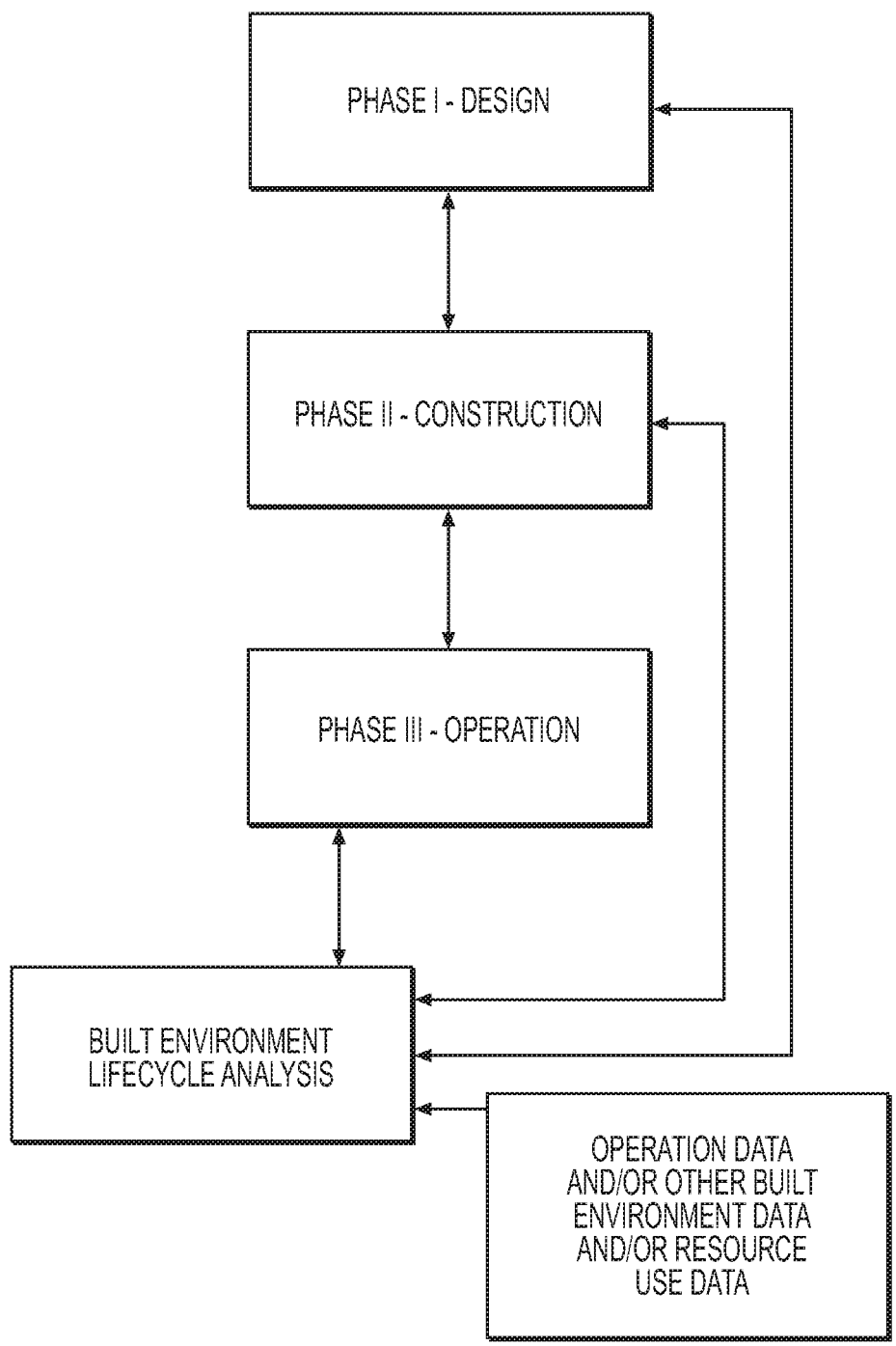
FIG. 1 is a block diagram illustrating an exemplary method for the use of the algorithmic and metric framework across the phases of the construction project.

Reference will now be made in detail to the disclosed embodiments, examples of which are illustrated in the accompanying drawings. Wherever convenient, the same reference numbers will be used throughout the drawings to refer to the same or like parts.

These embodiments are described in sufficient detail to enable those of ordinary skill in the art to execute one or more embodiments of this disclosure.

The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment and not intended to suggest hat the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not structure or function.

As used in the following discussion and in the claims, the terms "including" "is", "comprising", "containing", etc. are used in an open-ended fashion, and thus, should be interpreted to mean "including, but not limited to." If closed language is included, "consisting," and "consisting essentially of" it will be given its art recognized meaning.

As used herein, "building" and "structure" are used interchangeably to refer to a built environment and include, but are not limited to, office buildings; homes; hospitals; department, warehouse, and other stores; multi person dwellings, for example, apartment complexes, condominiums, dormitories; hotels; arenas and convention centers; factories; government buildings, e.g., prisons, police and fire stations, city halls, libraries, and the like. As used herein "building project" refers to the verb "build" and refers to any environment that might be "built."

Unless specified otherwise, "BEMs" refer to general resource use models but can include energy specific models. Also, "current" or "immediate" may be used interchangeably to refer to the built environment for which the system provides real time feedback. Built environments include the current built environment unless otherwise specified. For purposes of this invention reference to "energy models" or "resource models" should each be understood to be "energy and/or resource models."

As used herein resource use refers to typical resources such as electricity, natural gas, water, sewers, etc., as well as, the deterioration or loss of efficiency of the components of the built environment, for example, HVAC unit failures, or reductions in efficiency causing the level of typical resource use to rise.

The present disclosure is directed to an improved system and method for coordinating the design, construction and subsequent operation of a building. Currently, designers, engineers, construction managers, and operations mangers of a single built environment use widely varying software platforms, whose choice depends upon who the building architect, engineer, energy modeler or construction manager may be and what software they are most familiar and comfortable with. In short, the AEC industry already collects a wide variety of data, but at present there is no practical platform that can coordinate that data and use the information to provide improvements across building design, construction and operation. The system as described herein addresses this shortcoming in the prior art. The system as described is a computer based system that collects data from a variety of sources, including, but not limited to the design of a built environment, the energy modeling, the construction, the actual resource use during operation, and metrics from physical sensors provided in the built environment, as well as occupant feedback regarding the built environment. The system as described uses algorithms to sort the data looking for, by way of example, patterns, failures, successes, and other information that may be relevant to the designer or engineer in the immediate built environment.

The system as described may be agnostic to the various AECO software platforms or physical sensors that collect the information. As used herein, "agnostic" refers to a system that includes the necessary interfaces to collect data from a variety of software platforms or types of hardware and is therefore, neither limited by the particular hardware nor software that the designer, general contractor or building operator chooses. The system as described herein can overlay existing software platforms that already collect some information. The system as described receives inputs through APIs from the various software platforms that are being used, for example, from a designer or from a construction manager. The data is then transferred to and maintained in raw form outside the particular software platform to thereby allow analysis of the immediate data in view of all (or some subset) the other preexisting data in the system. The information would then be analyzed, in real time, to provide recommendation for improving resource use through changes to one or more of the design(s), construction or operation of the building.

In any design project, variations from the design to the operation of the built environment exist. This difference between expectation of use and actual use can have a substantial impact on building resources. For example, the building design may specify efficient systems in certain areas anticipating high traffic that never materializes during operation. Likewise, other areas may not anticipate high traffic, but nonetheless end up as high traffic areas. In practice, this results in areas of the design being overdesigned or underdesigned. Typically, areas that are underdesigned will fail prematurely and those that are overdesigned increase the construction costs and carbon footprint of the built environment. There is no current way to address these issues during the design phase. At present, these issues, if addressed at all, may be addressed through operational resource studies, where one looks at the resource use and then makes adjustments to the built environment, as available.

The system will first be described based upon the various phases associated with development of a built environment, i.e., design, construction and operation. While described in this manner for context, it is not anticipated that the platform as described herein must be applied to all of the described phases. As will become apparent from the description below, this platform may be used in one or more phases of development or any subpart or combination thereof.

Phase I—Design

The design phase of any built environment project sets the foundation for the entire development. During this phase the construction documents for a built environment are prepared. During this phase, architects, civil, structural, mechanical, electrical and plumbing engineers design the specifics of the built environment. It is during this phase that initial BEMs are used to estimate the resource use of the structure upon completion. The system as described herein having collected data on a wide variety of prior built environments and their operation, can provide a number of real time improvements to the design phase including for example, more accurate assumptions for the energy model, possible design changes based upon updated operational use patterns, a more accurate picture of the lifecycle of certain engineering choices, for example, sizing of the HVAC system.

In one embodiment, the system can be used to generate a resource benchmark based upon the operational information and the design information. The operational benchmark can be used in place of simple projections to improve the accuracy of the BEMs.

In one embodiment, design data feeds into one or more hardware processors. Processors may include any known processing devices, such as a microprocessor from Pentium™ or Xenon™ family manufactured by Intel™. Examples of design data include building plans, cost projections, energy or other resource models prepared by one or more architects, engineer or energy modelers. The system and processes described herein pair seamlessly with the way Architecture, Engineering and Construction (AEC) firms use software in the design environment and construction such as Revit, SketchUp, TRANE TRACE, Carrier HAP, DesignBuilder, Rhino 3D, Grasshopper for Rhino, Ladybug and Honeybee for Grasshopper, Dynamo Studio, etap, EasyPower, etc, through plug-ins, APIs and the like.

According to one embodiment, the system can be automated to develop the best type and placement of sensors in the current building project.

Phase II—Construction

In today's more sustainable practice, not only are there inefficiencies in the design phase, but there are also deviations from implementing the intended design during the construction phase. This deviation can come from accidental contractor error or the impracticality of the original design to be built as intended. In commercial construction, contractor errors are sometimes overlooked because contractor/sub-contractor performance is not being tracked, or because there is no way of knowing whether or not the construction documents are implemented in their entirety. More often than not, contractors and sub-contractors "cut corners" due to cost and pressure to adhere to timelines. The system as described aims to eliminate these discrepancies and/or track the implication of these discrepancies in the final building operation and resource consumption.

At present, no system tracks the construction phase of a project to examine the impact of construction deviations on building operation. Further, to the extent a construction deviation affects operation, it is unlikely that the impact of the deviation will ever be tracked back to the original (issue or) modification. In practice, the deviation would present, for example, as an equipment failure or a rapid decline in efficiency. Once discovered, the issue will likely be addressed as an operational issue, but there is no system whereby feedback can be provided in subsequent building projects.

According to one embodiment, the system as described can provide tracking of construction information and link that information to downstream operational issues, as well as upstream design issues. For systems such as the one belonging to Flux that already collect some construction information, the present system can either assimilate the collected information and provide requests for supplemented information or it can provide a platform for collection of construction information.

According to one embodiment, based on the model outputs and BEM analyses from the design phase, the system will populate a database with pertinent international building codes (IBCs) for each group of subcontractors or any personnel engaged in the construction process. Each personnel will now be able to verify and "check-off" everything he/she has completed within the construction of each specific phase in accordance with the IBCs and construction instructions. Furthermore, to verify the accuracy of the personnel inputs, the system can require a photographic (media) verification of each "checked-off" item. The use of photographic (media) verification makes it possible for the owner, architect, engineer, general contractor, subcontractors, or anyone with approved access to observe the building completion in real time from any (internet connected device/computer). A photographic log can also be used to observe construction and/or any variations in the event of unanticipated operational failures or reductions in efficiency.

The verification process is implemented so that the construction is based on the original design and all deviations from that design will be fully understood and documented. The system understands what was designed and what was actually built so that it can properly categorize design versus construction successes and failures and provide appropriate interpretation of sensor data through machine learning, deep learning or other algorithmic optimization methodologies.

According to one embodiment, if using the system construction tracker, the verification system is very intuitive in that personnel are able to verify and keep track of their construction assignments and tasks via a graphical user interface. The encrypted interface allows for communication amongst the personnel and allows the key stakeholders of a project (i.e. the owner/architect) to keep track of completion status. Furthermore, this process will allow personnel to submit change orders and suggest improvements for future building models.

In one embodiment, one or more of the hardware processors executes a set of construction instructions to be employed in Construction Phase II based on the design data and the operations data from the database.

An exemplary method for building management employed in Construction Phase II is described below. In one embodiment, the construction contractor sends to the one or more hardware processors, verification of completion of construction requirements that are specific to the construction contractor's tasks. The construction contractor may include any of general or subcontractors, including mechanical, electrical, and plumbing (MEP) service providers. Processors may include any known processing devices, such as lap top computers, tablets, smart phones and the like. In the preferred embodiment, the construction contractor sends verification by "checking-off" construction requirements as they are completed, wherein a "check" next to the requirement not only indicates completion of that task but also verifies that the work done is consistent with the requirements and materials laid out in the design. As will be readily apparent, the system as described can also be used to track building costs and construction status in real time.

In yet another embodiment, completion of construction requirements is supplemented by an image (any media) taken by one or more construction contractors or drones and sent to one or more of the hardware processors. The image may be taken with any media collection devices such as a camera in a mobile phone, a digital camera, or by any other aerial, terrestrial, or water based media collection device, or by drone(s).

According to one embodiment, when construction deviations are noticed through media, the system has the ability to analyze the impact of the deviation on resource use and provide new recommendations to mitigate or reduce the impact of the construction deviation. Such mitigation recommendations may be in the form of changes in design, changes in downstream construction, or changes to the long term anticipated resource use.

According to another embodiment, the information collected in JOULEA can be used to provide improved cost and time estimates for building construction. Building construction costs are notorious for being overbudget and timing is often delayed. At present, only a few software programs even attempt to address the differential between estimated cost and actual cost in a built environment and none are used to estimate timing issues. According to one embodiment as described, estimated construction pricing for a built environment can be compared to actual construction costs and timing data that has been collected from multiple built environments. As described, information on typical price overages and delays can be provided to those preparing the pricing or to the general contractor or the construction manager. Alternatively, the system can compare the anticipated build to prior builds to determine patterns associated with cost overages and delays.

According to another embodiment, the system can be used to reduce or minimize anticipatable delays during construction. When construction delays are based upon materials or professionals not being available or a lack of sufficient material to complete any given project, the system as described can be used to provide real time feed back to the contractors on upcoming projects. Since the system will include verified construction data or drone images, the project status can be ascertained and evaluated in real time. Coupling that information with materials orders and professional schedules allows the system to prevent delays by, for example, notifying the contractor or subcontractor that the amount of materials is too low to complete an upcoming project. Likewise, based upon the construction data that is collected, the system can provide timelines for subcontractors reducing the time periods when the job is ready but the subcontractor is not available.

Phase III—Operation

After the building has been constructed, the system as described herein can continue to be used to improve the energy and resource use of the immediate built environment. As the system continues to collect data from the current built environment, it can provide feedback to building management regarding issues, such as efficiency degradations, equipment wear and failure, and updated information on ways to improve resource use. Since the system uses machine learning, deep learning or other algorithmic optimization methodologies, as new projects are loaded to the database and new information is discovered, the system can revisit the operational information of existing buildings to determine whether the new information can provide a means for improving resource consumption either within an existing project or within a completed project.

According to one embodiment, operational data, can be provided by actual resource use, including data received from indwelling sensors, as well as operational data from a third party platform, occupant input, resource studies and the like. Occupant input can come from one or more of the owner, the property manager, the tenants, AECO firms, etc. In addition, the system may be configured to periodically request information from the occupants in the form of questions.

During the operation phase, the present disclosure will employ sensors and commercial-off-the shelf (COTS) metering infrastructure, along with BEMs, to track how people use the building. Sensors that are typical in the monitoring industry will be deployed throughout the building, inside and out, to detect levels of usage. In addition, sensors can be placed on system equipment to see if the equipment is performing to the level designed by the MEP engineers during the design phase. The sensors may be chosen from any manufacturer that allows a method of open platform communication protocols such as Modbus, BACnet, etc. from manufacturers such as Eaton, Schneider, etc. The raw data from these sensors will allow for machine learning, deep learning or other algorithmic optimization methodologies.

The JOULEA System

All of the data collected by the sensors will be sent back to the primary database. The analysis of the performance (sensor) data by the algorithmic and metric framework will be used to create more optimal final designs for future buildings through machine learning, deep learning or other algorithmic optimization methodologies. This way, architects, MEP engineers, contractors, sub-contractors, or any other building management personnel are able to discern the practicality of a building design and construction implementation. According to one embodiment, the sensor data may be supplemented by user information on shortcomings in the building environment.

The repeated use of this algorithmic and metric framework will, over time, yield an intelligent, learning database of models, data, and key metrics, usable to reduce discrepancies between resource models and actual resource use for future building projects. Overall, the present system will enable comparison of actual building performance to BEMs, as well as design and construction choices.

According to one embodiment, the system may work as an operating system (OS) that may attach to all design, construction and operation platforms via hardware and software plug ins and APIs.

FIG. 1 is a flow diagram illustrating an exemplary system as described herein. FIG. 1. will be described by way of the information that flows between the various phases. As will be discussed below, the system comprises the multiple interconnected elements of hardware, each running software, allowing the hardware to communicate, wired or wirelessly, to carry out the described processes. As seen in FIG. 1, data developed in the design phase will be loaded to our system for lifecycle analysis. The design data will be analyzed in view of available operational data and/or built environment data. Recommendations will be sent back to the developers and architects in the design phase. Once the design is fundamentally established, the design information will be communicated to the individuals and platforms in the construction phase. As the construction is carried out, the construction platforms will provide data to the system for lifecycle analysis. In the event of construction deviations, the system will provide recommendations back to the construction platforms. Depending upon the recommendations provided during the construction phase, it may be necessary to make intermediate revisions to the design. In the event of design revisions, the design data will again be fed to the system. Finally, all of the design and construction information will be coupled to the operational data that is developed in the third phase. The design and construction data are provided to generate a clear understanding of how the building was intended to function and how it was actually built. The system can then compare the expectations and actual construction against the operational data to understand the complete lifecycle of the building. With this information, subsequent building projects can be improved both in design and/or construction. Likewise, the BEMs in the design phase for future projects may be rendered much more accurate.

According to one embodiment, the outputs from each preceding phase feed into the next phase of the cycle with the overall goal to optimize the "critical path." The critical path is a term of art in the industry understood to be the sequence of tasks which define the shortest completion period for the construction project.

Figure 2:
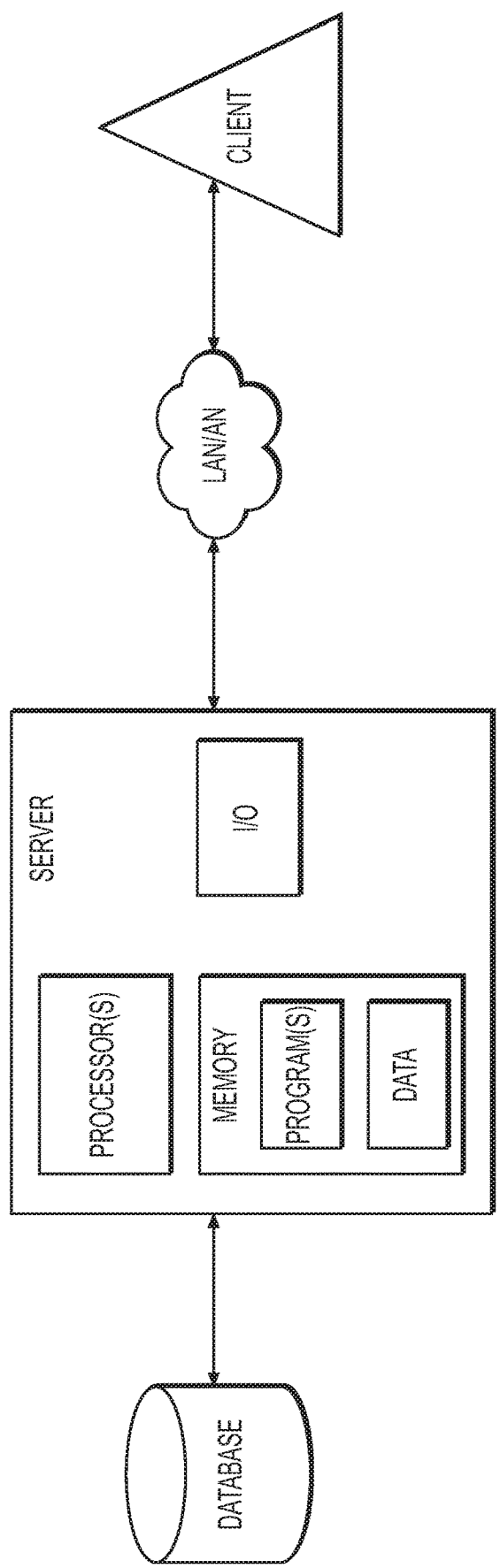
FIG. 2 is a block diagram illustrating an exemplary server functioning to fulfill requests from a client.

FIG. 2 is a block diagram illustrating an exemplary server functioning to fulfill requests from a client. In FIG. 2, the cloud hosted database can be one of several products currently available and generally known to those skilled in the art. However, in the preferred embodiment, the database is one that can run in the cloud as a service, such as an Oracle Database and Microsoft SQL. The database vendor deploying the database as a service can be one of several vendors currently available and generally known to those skilled in the art. However, in the preferred embodiment, the vendor is the Microsoft Azure SQL or the Amazon Web Services (AWS).

Figure 3:
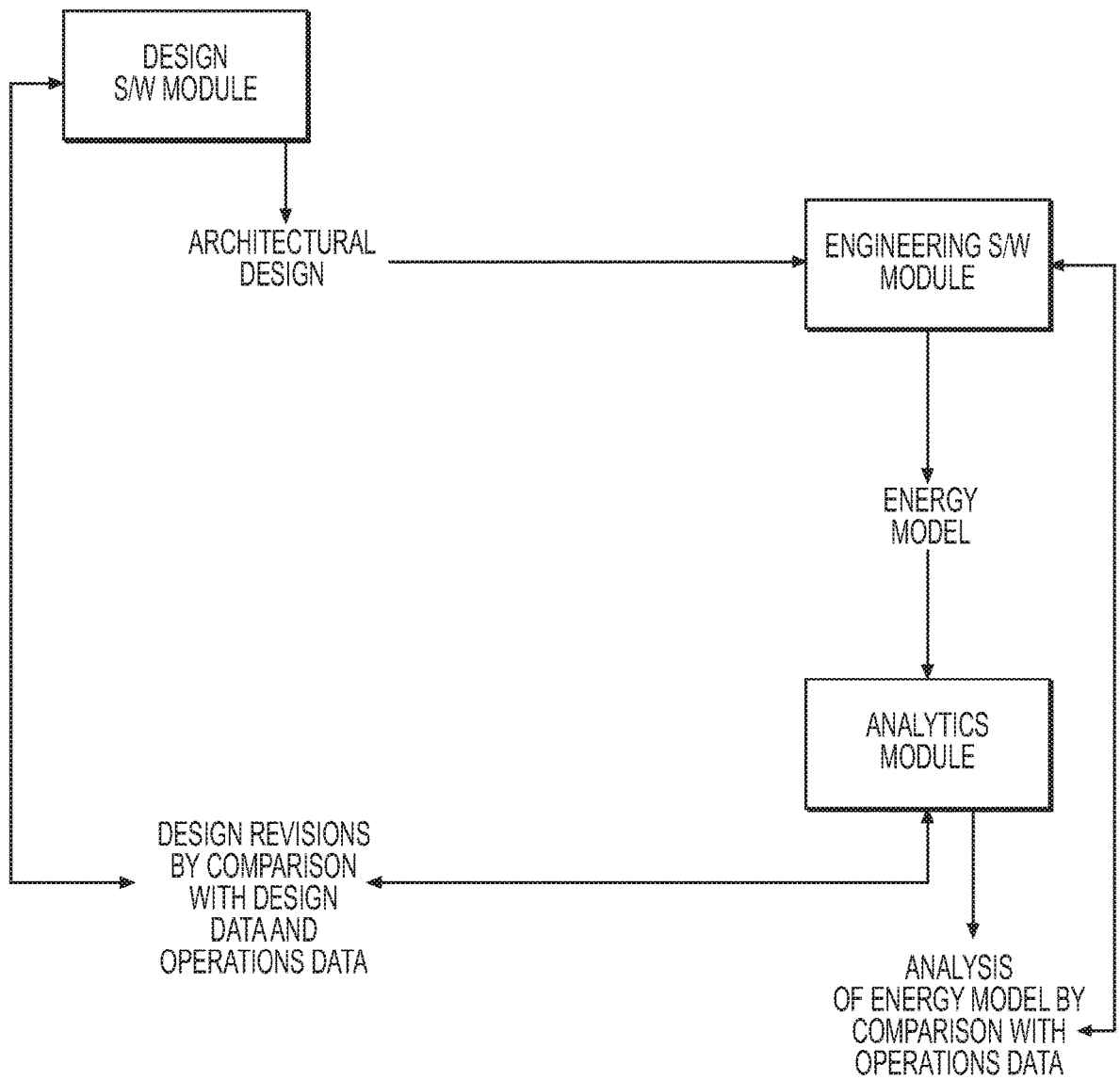
FIG. 3 is a block diagram illustrating an exemplary method for the use of the analytical framework applied to a design module.

FIG. 3 is a block illustration showing the method and system of the design phase according to one embodiment. According to the embodiment shown, the architect using the software (S/W) platform of his choice develops an architectural design of the building or structure that he wants to develop. The architect then sends his design to the engineering group so they can determine, among other things, whether or not they can build the structure as designed, and if they do, what type of resource usage will the structure have. The engineering team will take the design and load it into their software platform of choice and perform their analysis. Using the system as described, the engineering team would have their design, and their energy model plugged into through APIs by JOULEA for analysis and comparison with the data that has been collected from other built environments. JOULEA will compare the design and the energy model to structures having similar characteristics. Unlike the IES modeling software of the prior art which compares energy models only when the new structure and the prior structure have sufficiently overlapping qualities, e.g., size, orientation, locations, etc., JOULEA compares details of the design against similar details of other designs to assess the impact of the design elements on the resource usage.

As seen in FIG. 3, the JOULEA system will provide analysis back to both the Architect and the Engineers. The system can be set up in any art recognized manner to provide the same information to both the Engineers and Architects, but in the embodiment shown, the Engineer receive a comparison between their energy projections and what operations data in JOULEA suggests the actual energy use is likely to be. The Architect in the embodiment shown will receive design recommendations based upon the impact of the individual features on resource usage. In each instance, the information will be provided to the Architect or Engineer in a form compatible with the software platform that they are using.

In another embodiment, the Architect and/or Engineers could receive information from JOULEA on other aspect of the structure's features, for example, failure or wear. In this embodiment, JOULEA may see a pattern of early failure of certain HVAC units when used in buildings over a particular size. This type of information could be fed back to both the Architects and Engineers to raise issues and provide an opportunity for appropriate change to prevent this type of early failure. As will be clear to the skilled artisan when doing a feature by feature analysis, JOULEA can also combine features into any number of combinations looking for patterns that will improve the building design and operation.

Figure 4:
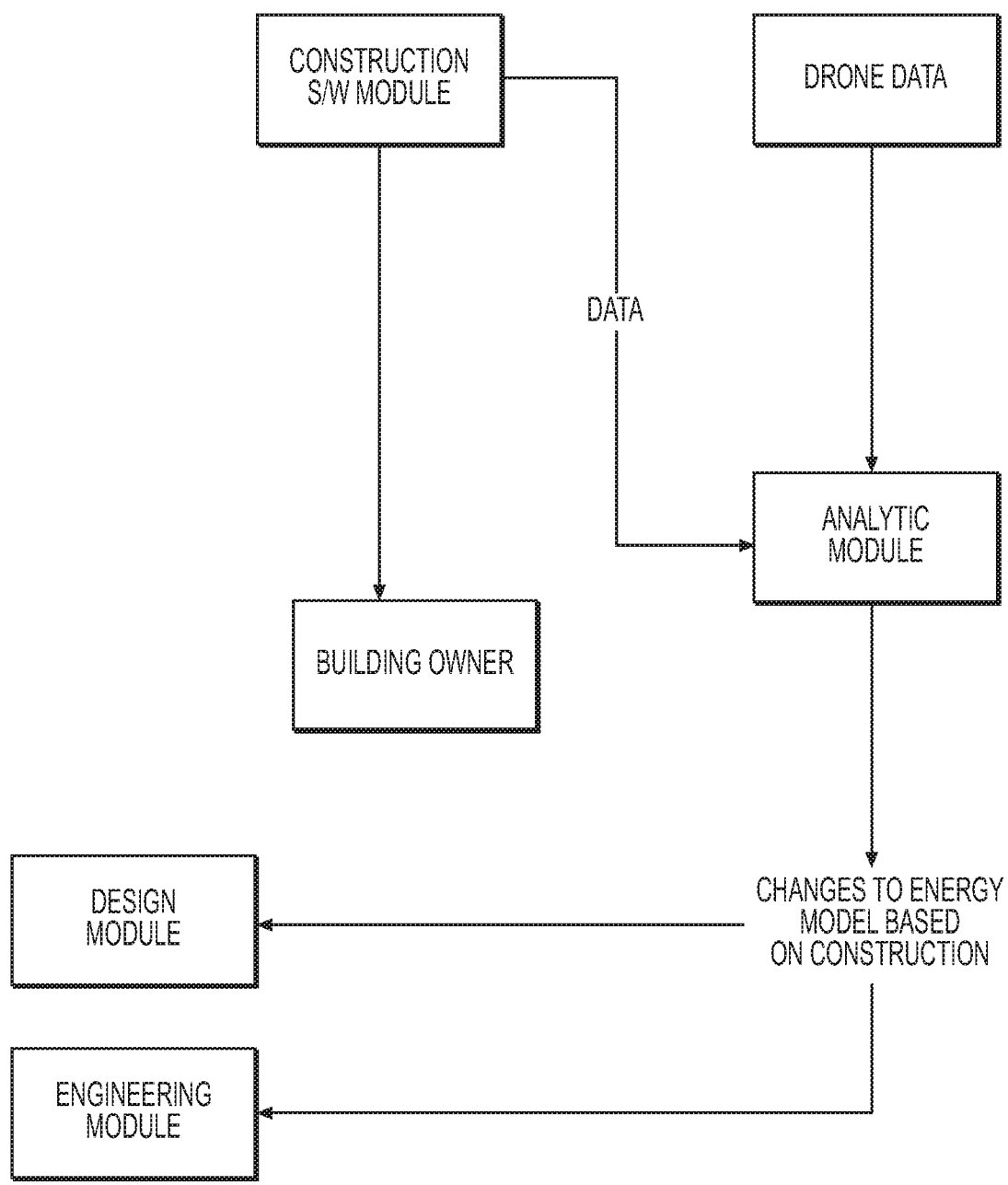
FIG. 4 is a block diagram illustrating an exemplary method for the use of the analytical framework applied to a construction module.

FIG. 4 is a block illustration showing the method and system of the construction phase according to one embodiment. After a building plan has been approved, the next steps are in the construction of the building or structure. As seen in FIG. 4, the construction team, working with the software platform of their choice, will collect information as the build progresses. The construction information can be captured in a variety of manners. First, the construction data may come in via a handheld device using an app developed specifically for use with JOULEA or from another third party source. Aspects of construction can be recorded and may be memorialized by a photograph. In one embodiment, a drone may be used during the construction of the structure to deliver independent data on what has been done during construction. The information may be fed to JOULEA through any appropriate system, wired or wireless According to one embodiment, important details that should be captured during construction include any substitutions or deviations from the original building proposal. Using JOULEA, these changes may be introduced to the resource calculation to determine whether or not they will impact the anticipated resource consumption. As seen in FIG. 4 this allows real time updates to be provided to the Architect and Engineers to compensate for such deviations or prevent them. If the resource performance gap exists, JOULEA allows the building owner to understand what is likely causing the deviation and how to address it in this building or in the next one.

Figure 5:
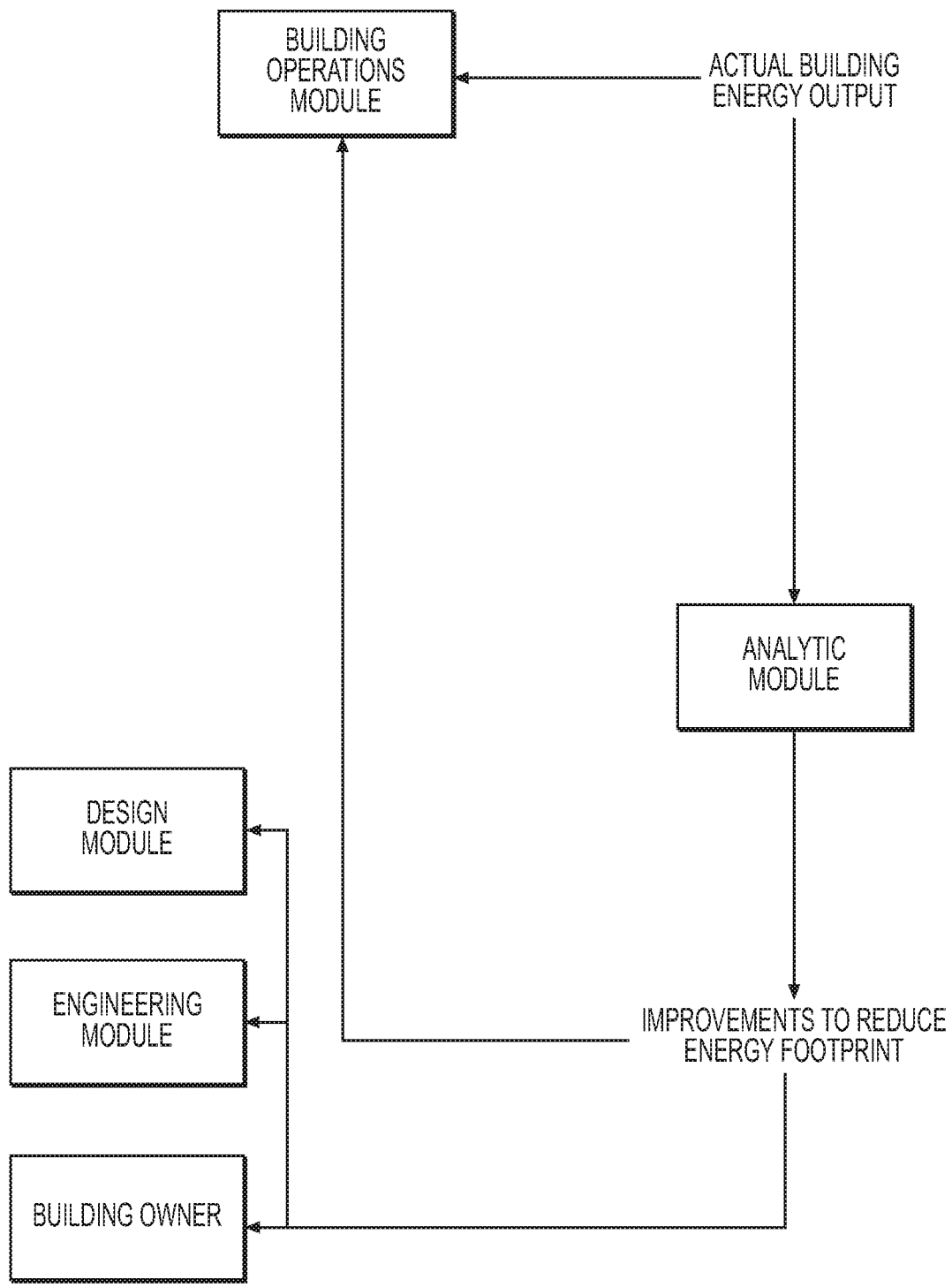
FIG. 5 is a block diagram illustrating an exemplary method for the use of the analytical framework applied to an operations module.

FIG. 5 is a block diagram illustrating a method and system as described during building operations. According to one embodiment, during operation, the building's resource use is collected and compared via JOULEA with the resource use of other structures having similar feature(s). According to one embodiment, JOULEA provided information that can be fed back to building operations in real time to improve its resource use. According to another embodiment, JOULEA can compare the post-occupancy data to the original design and energy model of the building to determine where inaccuracies are found in the resource model. Also, the building operations data can be compared against construction changes from the design to determine whether and to what extent construction changes impacted the actual operations versus the resource model.

Figure 6:
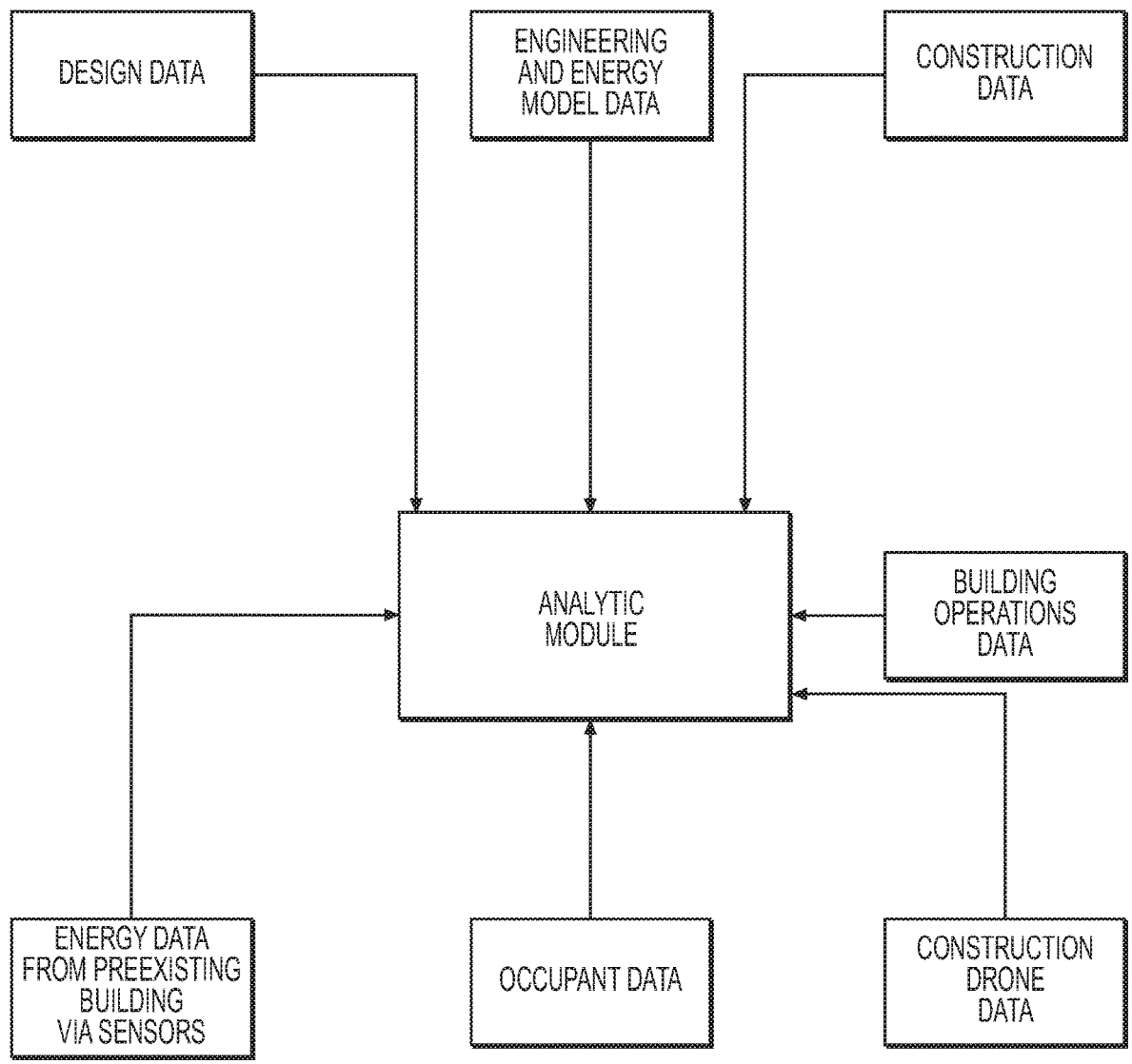
FIG. 6 is a block diagram illustrating one exemplary data collection for the analytics module.

FIG. 6 illustrates the analytic module of the JOULEA system and show a variety of data that may be collected by JOULEA to form a basis for understanding the energy performance gaps in typical modern construction. As can be seen in FIG. 6, in addition to the building operation use data, the system can collected data from one or more of the noted sources or any combination thereof. The more data the system collects the more comprehensive and reliable the data predictions will be. Most construction projects, buildings, apartment complexes, and hospitals and the like are referenced by their overall square footage. So for example, a particular property manager may manage 10 million square feet of property. This could be in a few buildings or many smaller buildings. As the JOULEA system collects additional performance information the reliability of the data improves. According to one embodiment, the JOULEA system includes at least 10 million square feet of data, for example, at least about 20 million square feet of data, for example, at least about 40 million square feet of data, for example, at least about 50 million square feet of data, for example, at least about 100 million square feet of data.

According to one embodiment, the JOULEA system collects design data, engineering data and construction data. While in a preferred embodiment, the design, construction and engineering data would all be available for a structure, having only one or two of the sets of data still provides a significant improvement in the quality of the information included in the building operations data. In typical construction, resource sensors or monitors may be installed in a building during construction; however there is no regularity to the sensors that might be installed. Sensors or monitors for post-occupancy monitoring are included and selected on a project by project basis. The JOULEA system can include data from original building sensors that were installed during construction or can include additional sensors that are added to collect specific post-occupancy data. According to one embodiment, the JOULEA system collects occupant data. In this embodiment, the occupant data, which can include users, property managers or anyone else having contact with the building provides not only an understanding of the building operations data, but also allows JOULEA to determine whether there are common underlying causes to occupant issues and if so, to automate a response to those issues. JOULEA can also collect any externally available information, including for example, media and images from drones, or infared or other images displaying heat losses. Based upon this disclosure, the skilled artisan can recognize additional type of information that may be collected and included within the system.

Figure 7:
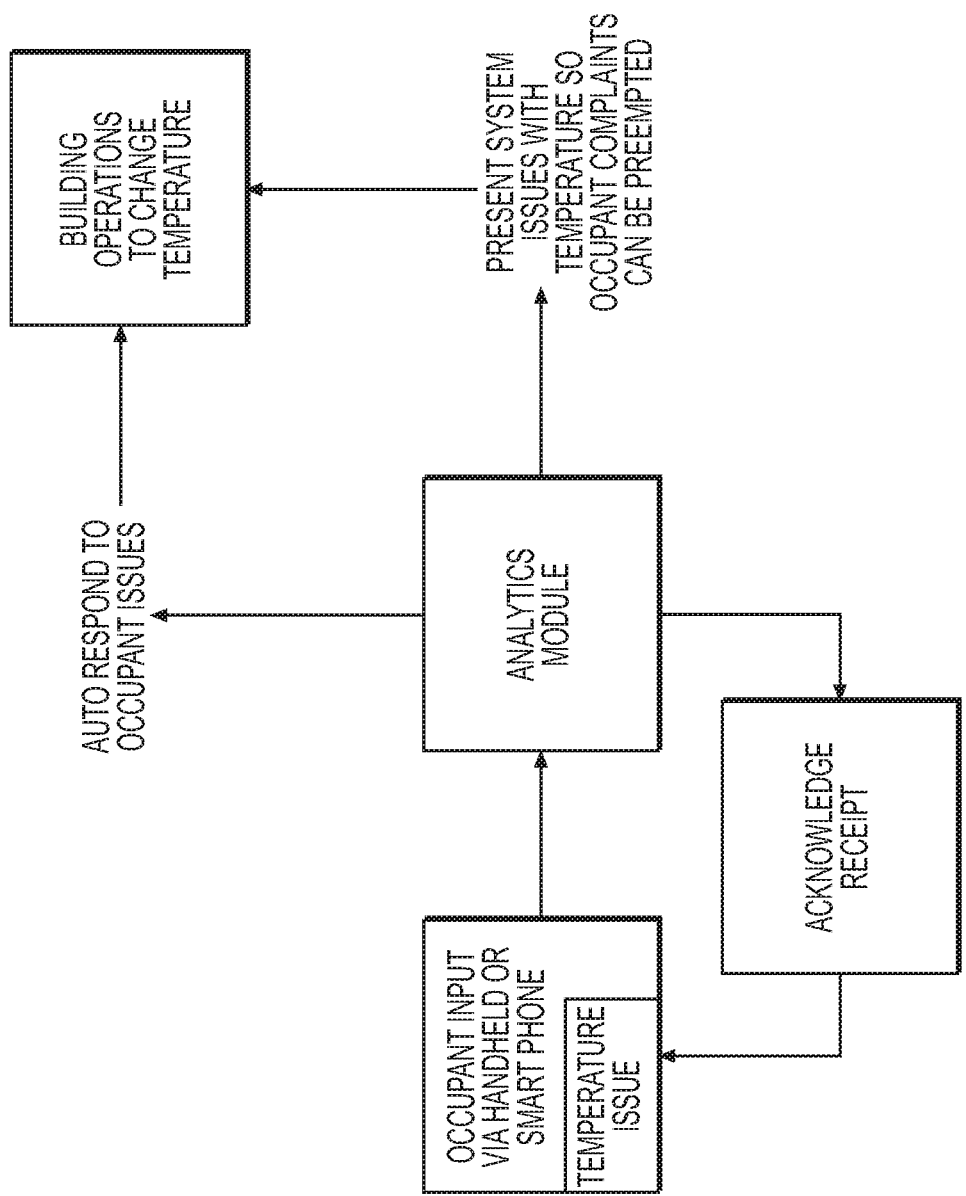
FIG. 7 is a block diagram illustrating one exemplary method for using the operations module to control a built environment.

According to one embodiment as illustrated in FIG. 7, the JOULEA system may be able to automate building operations to minimize and respond to occupants issues. As seen in FIG. 7, an occupant via telephone, or a smart phone app, for example, can report an issue to the building management. In the embodiment that is shown, the issue is temperature, say a conference room is too hot. The JOULEA system can receive that information and provide an acknowledgment to the occupant, while concurrently either changing the temperature at that zone of the building, or report the need for a temperature change to building management. In addition, the JOULEA system can track occupant issues to preempt occupant complaints. So according to this embodiment, JOULEA may inform the building management that whenever the outside temperature is above 80 degrees Fahrenheit, this particular conference room is typically reported as too warm. The system can be programmed to automatically lower the conference room temperature after the outside temperature reaches 80 degrees Fahrenheit, Many other automatable environment changes will be readily apparent to the skilled artisan.

In some embodiments, the server may include one or more processors, one or more memories comprised of programs and data, and one or more input/output (I/O) devices. The server may be an embedded system or similar computing devices that generate, maintain, and provide web sites, application program interface (API) and/or mobile applications. It is to be understood that the server may be standalone, or it may be part of a subsystem, which may integrate a larger system.

Processors may include any known processing devices, such as a microprocessor from Pentium™ or Xenon™ family manufactured by Intel™.

Consistent with the present disclosure, the server fulfils requests from the client. The client establishes a connection with the server over a local area network (LAN) or wide-area network (WAN), such as the Internet. In the present disclosure, the client can be a PDA, computer, iPad, smart phone, or other wireless device, generally known in the art that has a web-based browser application providing a viewable portal to access the user interface.

In one embodiment, one or more passwords are required to access the information displayed by the user interface, which is accessible via one or more clients. For example, one or more passwords authorize three levels of access to the various stakeholders of a particular construction project. These stakeholders include the owner, architect, various engineers, general contractor, and/or subcontractor(s) and the information displayed on the interface will be customized.

Although the present disclosure has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive and the scope of the invention to be determined by any claims supportable by this application and the equivalents thereof, rather than by the foregoing description.

The invention claimed is:

1. A method for reducing the performance gap between a structure's resource model and a structure's resource use comprising:
   obtaining both resource model and post-operation resource use data from multiple built structures, wherein the post-operation resource use data from multiple structures comprises data for at least 50 million sq. feet of occupied space;
   obtaining a design, including design features, and a resource model for a new construction;
   comparing the design features with features in the multiple built structures;
   locating at least one feature or at least one series of features that are common to the built structure and the new construction;
   determining an accuracy of the resource model for the new construction based at least upon information on the common feature(s).

2. The method of claim 1, wherein the accuracy determination is carried out by providing recommended changes to the new construction.

3. The method of claim 2, wherein the recommendations are made on a feature-by-feature basis.

4. The method of claim 1, wherein the post-operation resource use data includes sensor data.

5. The method of claim 4, wherein sensors are located inside and outside the structure.

6. The method according to claim 4, wherein sensors are installed in the structure during construction.

7. The method of claim 1, wherein the post-operation resource use data from multiple structures comprises data for at least 100 million sq. feet of occupied space.

8. The method of claim 1, wherein the data from the multiple built structures comprises design data or construction data.

9. The method of claim 8, wherein the data from the multiple built structures comprises construction data.

10. The method of claim 1, wherein the resource model is a building energy model.

11. The method of claim 2, wherein the recommendations are provided in real-time.

12. The method according to claim 1, wherein the method is carried out on a single design feature and its associated resource model.

13. The method of claim 12, wherein the method is used to correctly size an HVAC system.

14. The method of claim 1, wherein the design feature resource model is generated concurrently with the process of determining its accuracy.

15. The method of claim 14, wherein the method is used to correctly size an HVAC system.

16. The method of claim 1, wherein the resource model may include all building resources or a sub-set of building resources.

17. The method of claim 1, wherein the method is used to correctly size an HVAC system.

18. The method of claim 1, wherein the method is carried out by a system comprising:
   a memory device for storing a set of instructions;
   one or more hardware processors to execute the set of instructions to:
   obtain both resource model and post-operation resource use data from multiple built structures;
   obtain a design, including design features, and a resource model for a new construction;
   compare the design features with features in the multiple built structures;
   locate at least one feature or at least one series of features that are common to the built structure and the new construction; and
   determine the accuracy of the resource model for the new construction based at least upon information on the common feature(s).

19. The method of claim 18, wherein the system communicates with a design software platform.

20. The method of claim 19, wherein the accuracy determination is carried out by providing design, construction or operations alternatives to the design software platform.

* * * * *